United States Patent [19]

Won et al.

[11] 4,307,201

[45] Dec. 22, 1981

[54] HIGHLY ADSORPTIVE MACROPOROUS POLYMERS

[75] Inventors: Richard Won, Palo Alto; Robert P. Zajac, San Jose, both of Calif.

[73] Assignee: Diamond Shamrock Corporation, Dallas, Tex.

[21] Appl. No.: 160,502

[22] Filed: Jun. 18, 1980

Related U.S. Application Data

[63] Continuation-in-part of Ser. No. 938,354, Aug. 31, 1978, abandoned.

[51] Int. Cl.$^3$ .............................................. C08J 9/28
[52] U.S. Cl. ..................................... 521/64; 264/41; 264/53; 521/61; 521/187; 521/188; 521/918
[58] Field of Search ...................... 264/41, 53; 521/61, 521/64, 187, 188

[56] References Cited

U.S. PATENT DOCUMENTS

| 3,475,355 | 10/1969 | Decker | 521/64 |
| 3,522,201 | 7/1970 | McNair | 521/64 |
| 3,544,489 | 12/1970 | Dowbenko et al. | 521/64 |
| 3,655,591 | 4/1972 | Seiner | 521/64 |
| 3,661,807 | 5/1972 | Seiner | 521/64 |
| 4,007,142 | 2/1977 | Clarke | 521/64 |
| 4,152,496 | 5/1979 | Barrett et al. | 531/139 |

OTHER PUBLICATIONS

Ency. of Polymer Sci. and Tech., vol. 7, (1967), p. 713.

*Primary Examiner*—Morton Foelak
*Attorney, Agent, or Firm*—William A. Skinner

[57] ABSTRACT

A method for preparing macroporous aminotriazine-aldehyde resins by reaction in the presence of an acid catalyst and a miscible porogen. The resin product has high surface area and porosity and displays excellent sorption capacity.

18 Claims, No Drawings

HIGHLY ADSORPTIVE MACROPOROUS POLYMERS

This is a continuation-in-part of copending application Ser. No. 938,354, filed Aug. 31, 1978, and now abandoned.

FIELD OF THE INVENTION

This invention relates generally to a process for the preparation of aminotriazine-aldehyde resins having improved adsorption characteristics, and more particularly to a process for the condensation of polyaminotriazines and formaldehyde in the presence of an acid catalyst and a porogen to form macroporous resins having high surface area.

BACKGROUND OF THE INVENTION

The preparation of amino resins by the reaction of amino-bearing material with aldehyde to form a reactive monomer, followed by condensation polymerization to a thermosetting resin, is well known. Perhaps the most common resins of this type are the melamine resins resulting from the condensation of melamine and formaldehyde. These resins are widely used as molding compounds, adhesives, paper wet strength agents, and fabric treatment compositions.

Conventional amino resins do not display a useful sorption capacity and are relatively unstable under conditions of use as adsorbents. It would therefore be desirable to produce macroporous amino resins which have increased mechanical and osmotic stability while maintaining fluid permeability. Such permeability facilitates the flow and diffusion of liquid phases through the resin and enhances its usefulness for processes such as absorbing, adsorbing, catalysis, and the like.

SUMMARY OF THE INVENTION

It has been discovered that highly adsorbent macroporous amino resins can be prepared by reacting polyamino-triazines and formaldehyde in a molar ratio of about 1:2 to 1:7 in the presence of a miscible organic porogen and an acid catalyst. The reaction mixture is agitated and heated to at least about 65° C. until gelation occurs. The resin is then cured to produce a material having high porosity and surface area on the order of 100 m$^2$/g and up.

Resins prepared by the process of the invention have high mechanical and osmotic stability and greatly improved adsorption characteristics in comparison with conventional nonporous amino resins. The macroporous resins have demonstrated excellent adsorption capacity for the removal of color and organic matter from solutions such as wood pulp bleach effluent, and are also useful as support materials for enzymes, catalysts, biocides and the like.

DETAILED DESCRIPTION OF THE INVENTION

According to the present invention, a polyamino-triazine, i.e., a triazine having a plurality of substituted or unsubstituted amino groups attached, is reacted with formaldehyde to form the basic resin. Numerous polyaminotriazines are suitable for use in the process, such as melamine (2,4,6-triamino-1,3,5-triazine), benzoguanamine, diallylmelamine, and mixtures of these and other such polyamino-triazines. The term formaldehyde includes not only formaldehyde itself but also compounds yielding formaldehyde, for instance, paraformaldehyde and the like. Formaldehyde is generally preferred for use as the aldehyde component, usually in the form of an aqueous 30 to 45 percent solution since the resin preparation is generally carried out in an aqueous medium.

The mole ratio of polyamino-triazine to formaldehyde is not particularly critical and may range from about 2 to about 7 depending on the particular polyamino-triazine employed and the characteristics desired in the final product. For the preferred system of melamine and formaldehyde, a ratio of 3 to 5 moles formaldehyde per mole of melamine has been found most suitable for the process of the invention.

The condensation reactions of polyamino-triazines and formaldehyde are considerably influenced by pH, and the optimum pH range for the precipitation of macroporous resins has been determined to be from about 2 to about 5. Consequently, the use of a condensation-catalyzing acid in the process is recommended. Catalysts such as formic acid, sulfuric acid, hydrochloric acid, and acetic acid may be employed. Formic acid has proven to be most effective in the process and is the preferred catalyst. The amount of acid catalyst may range from about 0.01 to about 0.10 moles per mole of melamine, with 0.04 to 0.06 moles being the usual concentration.

The use of an effective miscible organic porogen is essential to the preparation of macroporous resins having the desired characteristics of high adsorptivity and large surface area. The porogen should be inert and miscible with all of the reactants. During the condensation, it serves as an internal diluent to introduce the desired sponge-like macroporous structure into the finished resin. The porogen may be selected from organics such as alcohols, thiols, amides, ethers, esters, or mixtures thereof. The preferred porogen for the process of the invention is n-propanol, which is miscible with all of the initial reactants in the process and has an appropriate boiling point (97°) which is above the normal polymerization temperature yet is low enough to allow eventual removal at the usual drying temperatures. The porogen may be present over a broad range of concentration in the reaction mixture, usually from about 5 to about 30 percent of the total volume. Concentrations in the range of 16 to 20 volume percent have been found to result in the optimum adsorptivity in the product resin for the preferred melamine-formaldehyde system. Other specific porogens useful in the process include ethoxyethanol and dimethylformamide.

Since the resin preparation is carried out in an aqueous medium, the total quantity of solids in the initial reaction mix is not critical and normally ranges from 30 to 55 percent by weight of the total mixture. A solids content of about 45 percent has been found to produce the most suitable resins with lower amounts resulting in a more friable resin and higher amounts reducing the porosity of the product.

The monomers, catalyst, and porogen are all charged into an appropriately sized reaction kettle, usually of glass or stainless steel construction and equipped with conventional heating and agitation means. The pH of the reaction mix is in the range of 2 to 5 initially. The reaction mix is gradually heated and agitated until solution of the initial reactants is complete, then heating is continued until polymerization begins and a gel forms. This initial reaction may be carried out at temperatures ranging from about 65° C. to about 95° C., preferably at from about 70° C. to about 85° C. The initial reaction time is dependent upon the temperature employed and on the rate of heat input into the reaction mixture. The average rate of temperature increase in the reaction mix is preferably maintained in the range of 0.5° to 5° C./min. until gelation. Reaction times will increase as the initial temperature is reduced. At 75° C., the reaction may continue for more than 30 minutes. The reaction can be conducted under pressure, which will affect the temperatures and times recited.

After the initial reaction, the resin is cured at from ambient to 100° C. for about 2 to 20 hours. The cure time may be shortened by elevating the temperature to the higher end of the range. During the curing step, the condensation goes to completion and the degree of cross-linking increases. Completion of curing can be determined by measurement of the resin stability to acid hydrolysis. During this step, the porogen is removed from the rigid polymer matrix by evaporation without substantial effect on the volume of the gelled resin. The miscible porogen may also be washed out with the aqueous phase either during or subsequent to the curing.

The product resin is then crushed, ground to the desired particle size (preferably less than about 2000 microns) and washed. The resin has the physical appearance of chalk. Characteristic materials will have a surface area of over 10 $m^2/g$ and up to about 1000 $m^2/g$ as measured by B.E.T. nitrogen multipoint analysis and a porosity of 0.2 to 1.0 as measured by heptane regain. Resistance to oxidation, as measured by $H_2O_2$ oxidation, is 100 percent at ambient temperatures for up to 5 hours. The typical resin has an adsorption capacity of over 200 $kg/m^3$ of color as cobalt chloroplatinate for paper pulp mill "E" effluent compared to conventional nonporous amino resin adsorptivity of less than 50 $kg/m^3$.

The finished resin may be further treated by known methods, for example, reaction with epichlorohydrin and/or amination, to provide materials having different characteristics.

The resins of the invention have particular utility in removing organic materials from fluid media by adsorption. By virtue of the combination of polar surface and chemical composition, the resins are efficient in the removal of acidic high molecular weight solutes from aqueous solution. These solutes can be desorbed from the resin by a variety of means, including peroxide treatment, which gives them an advantage over phenol-formaldehyde materials of similar structure. A typical application is in the treatment of paper pulp mill effluent which contains color bodies in the form of condensed guiacylpropane type structures, with carbonyl and carboxyl groups as well as phenolic hydroxyl. Such materials are effectively removed by contact with the macroporous resins of the invention. The resins also exhibit equilibrium adsorptive capacities for typical organic materials, i.e., 85 to 90 percent removal in a 0.01 M p-nitrophenol solution and 70 percent removal in munitions plant red water effluent.

The invention is further illustrated by the following specific examples.

EXAMPLE 1

225 g of melamine, 536 ml of formaldehyde (37 percent, aqueous), 240 ml of n-propanol and 12 ml of 88 percent formic acid were mixed in a jacketed resin kettle equipped with stirrer, condenser and thermometer. The mixture was stirred and heated to 80° C. until gelation occurred, after about 20 minutes. The temperature was held at about 80° C. for 16 hours to cure the resin. After cooling, the product was removed from the kettle, ground, and water washed. The resin was an opaque solid with a pore volume of 0.6 ml/g, a surface area of 160 $m^2/g$ and an adsorption capacity to paper pulp mill effluent of 280 $kg/m^3$ as cobalt chloroplatinate.

EXAMPLE 2

765 g of melamine, 1608 ml of formaldehyde (37 percent), 720 ml of n-propanol and 36 ml of 88 percent formic acid were combined as in Example 1. The mixture was stirred and heated to 75° C. until gelation (about 30 minutes). Heating was continued for an additional 12 hours at 80° C. After cooling, grinding and washing the product, resin was a white opaque solid with a pore volume of 0.74 ml/g, a surface area of 180 $m^2/g$ and an adsorption capacity to paper pulp mill effluent of 360 $kg/m^3$ as cobalt chloroplatinate.

EXAMPLE 3

44.3 g of melamine, 63.2 g of paraformaldehyde, 85 ml of water, 57 ml of n-propanol and 1.9 ml of 95 percent sulfuric acid were combined as in Example 1. The mixture was stirred and heated to 78° C. until gelation occurred. Heating was continued at about 80° C. for an additional 16 hours after which the material was cooled, ground and washed. The product was then heated at 100° C. for an additional 48 hours. The resulting resin was a white opaque solid with a pore volume of 0.35 ml/g and an adsorption capacity for paper pulp mill effluent of 125 $mg/m^3$ as cobalt chloroplatinate.

EXAMPLE 4

63 g of melamine, 150.5 ml of formaldehyde (37 percent), 25 ml of ethoxyethanol, 75 ml of water, and 3.35 ml of 88 percent formic acid were mixed as in Example 1. The mixture was agitated and heated to 80° C. until gelation occurred. Heating was continued at 80° C. for an additional 23 hours. The material was cooled, ground and washed. The resin was an opaque solid with a surface area of 213 $m^2/g$.

EXAMPLE 5

63 g of melamine, 150.5 ml of formaldehyde (37 percent), 25 ml of dimethylformamide, 75 ml of water, and 3.35 ml of 88 percent formic acid were mixed and reacted as in Example 4. The resin produce was an opaque solid with a surface area of 211 $m^2/g$.

EXAMPLE 6

The macroporous resins of the invention were prepared on a larger scale, using a polymerization kettle with a capacity of 190 liters. The reactants were added in the following order with agitation—104.9 liter formaldehyde (37 percent, aqueous, methanol inhibited), 44.1 kg melamine, 47 liter n-propanol, and 2.35 liter 88 percent formic acid. The contents of the kettle were heated gradually, with stirring. The stirrer was removed when the mixture reached about 65° C., and heating was continued until gelation occurred. A mild exotherm then raised the temperature to 80° to 85° C. The kettle jacket temperature was then raised to about 85° C., and this temperature was maintained for 4 hours. The resin product was then cooled, ground and washed. Reaction conditions and product characteristics for several batches are shown in the following table.

TABLE I

| Batch | Gel time (min) | Rate of heat to gel (°C./min) | Surface area (m²/g) | Color removal (kg/m³) |
|---|---|---|---|---|
| 1 | 25 | 2.4 | * | 320 |
| 2 | 22 | 2.7 | 180 | 300 |
| 3 | 18 | 3.3 | 220 | 250 |
| 4 | 18 | 3.4 | 250 | 265 |
| 5 | 16 | 3.7 | 245 | 260 |
| 6 | 16 | 4.4 | 260 | 350 |

(*not measured)

EXAMPLE 7

The resin prepared in Example 1 was used in the decolorization of tannin-containing surface water. A stream of 600 APHA surface water was passed through a 50 ml volume of the resin in a 1-inch diameter column at a rate of 11 ml/minute. A total of 12.5 liters of water was decolorized to an average of 25 APHA units with a maximum color of 75 APHA units.

EXAMPLE 8

A resin prepared as in Example 1 was used in the decolorization of an NaOH extract of a bleached sulfate paper pulp mill liquor, termed the "E" effluent. The caustic extract, having a total color of 5,355 APHA units, was adjusted to pH 4. The solution was then passed through 50 ml of resin in a 2 cm diameter glass column at the rate of 5 ml/minute (6 bed volumes/hour). The column effluent was collected in aliquots, the pH was adjusted to 7.6, and comparison was made with standards prepared from the feed solution to determine the percent of color removed. The run was terminated at the arbitrary point where color removal had dropped to 70 percent. For the resin of the invention, this occurred after a total color throughput of 350 kg/m³, expressed as cobalt chloroplatinate.

Three other commercially available adsorbent resins were tested in the same manner, and the results are shown in the following table.

TABLE II

| Resin | kg/m³ total color throughput to reach 70% removal |
|---|---|
| Example 1 | 350 |
| Amberlite ® XAD-2 | 28 |
| Amberlite ® XAD-7 | 120 |
| Amberlite ® XAD-8 | 80 |

(Amberlite resins are available from Rohm and Haas Company)

What is claimed is:

1. A process for the production of highly adsorbent macroporous resin having a surface area greater than 100 square meters per gram, which comprises reacting a polyaminotriazine and formaldehyde in a molar ratio of about 1:2 to about 1:7 in an aqueous medium in the presence of an acid catalyst and at least one miscible organic porogen, heating until gelation occurs, then curing the resulting resin, removing the porogen while keeping the volume of the gelled resin constant, and crushing the cured resin to form a particulate product.

2. The process of claim 1 wherein the proportion of miscible organic porogen ranges from about 5 to about 30 volume percent of the total reation mixture.

3. The process of claim 1 wherein the reaction mixture is heated to the range of 65° to 95° C. prior to gelation.

4. The process of claim 1 wherein the reaction mixture is heated at an average rate of temperature increase between about 0.5° C. and about 5° C. per minute prior to gelation.

5. The process of claim 1 wherein the reaction is conducted at a temperature of 70° to 85° C. and the resulting resin is cured at from ambient to 100° C.

6. The process of claim 5 wherein the reaction is maintained for a period of 10 to 100 minutes prior to gelation and the resulting resin is cured for a period of 2 to 20 hours.

7. The process of claim 1 wherein the porogen is removed by evaporation.

8. The process of claim 1 wherein the porogen is removed by water washing.

9. The process of claim 1 wherein the solids content of the reaction mixture is between 30 and 55 percent by weight of the total mixture.

10. The process of claim 1 wherein the polyaminotriazine is selected from melamine, benzoguanamine, diallylmelamine, or mixtures thereof.

11. The process of claim 1 wherein the polyaminotriazine is melamine.

12. The process of claim 1 wherein the porogen is n-propanol.

13. The process of claim 1 wherein the porogen is ethoxyethanol.

14. The process of claim 1 wherein the porogen is dimethylformamide.

15. The process of claim 1 wherein the catalyst is formic acid.

16. A process for the production of highly adsorbent macroporous resin, which comprises reacting melamine and formaldehyde in a molar ratio of 1:3 to 1:5 in aqueous solution, in the presence of a formic acid catalyst and n-propanol porogen, wherein the reaction mixture is heated to a temperature of 75° to 85° prior to gelation, followed by curing of the product for a period of at least 2 hours, crushing the cured material to form a particulate product, and removal of the porogen without substantial effect on the volume of the gelled product, to produce a resin having a porosity greater than about 0.2 ml per gram and a surface area greater than 100 square meters per gram.

17. A highly adsorbent macroporous polyamino-triazine formaldehyde resin having a surface area of at least 100 square meters per gram, produced according to the process of claim 1.

18. The resin of claim 17 wherein the polyamino-triazine is melamine.

* * * * *